(12) United States Patent
De Oliveira Seixas et al.

(10) Patent No.: US 11,980,165 B2
(45) Date of Patent: May 14, 2024

(54) PHYSICAL TRAINING DEVICE FOR ANIMALS WITH A THERAPEUTICAL AND ENTERTAINING COMPONENT

(71) Applicant: Alexandra Arminda De Oliveira Seixas, Charneca Da Caparica (PT)

(72) Inventors: Alexandra Arminda De Oliveira Seixas, Charneca Da Caparica (PT); João Carlos Da Palma Goes, Lisbon (PT); Carla Maria Quintão Pereira, Paço de Arcos (PT); Claudia Regina Pereira Quaresma, Lisbon (PT); Ricardo Nuno Pereira Verga E Afonso Vigário, Santo António dos Cavaleiros (PT); Rui Fernando Dos Santos Pereira Martins, Lisbon (PT)

( * ) Notice: Subject to any disclaimer, the term of this patent is extended or adjusted under 35 U.S.C. 154(b) by 611 days.

(21) Appl. No.: 17/050,888

(22) PCT Filed: Apr. 26, 2019

(86) PCT No.: PCT/PT2019/050007
§ 371 (c)(1),
(2) Date: Oct. 27, 2020

(87) PCT Pub. No.: WO2019/209129
PCT Pub. Date: Oct. 31, 2019

(65) Prior Publication Data
US 2021/0227791 A1    Jul. 29, 2021

(30) Foreign Application Priority Data
Apr. 27, 2018  (PT) .......................................... 110714

(51) Int. Cl.
*A01K 15/02* (2006.01)

(52) U.S. Cl.
CPC .... *A01K 15/027* (2013.01); *A61H 2201/1246* (2013.01); *A61H 2201/1652* (2013.01);
(Continued)

(58) Field of Classification Search
CPC .......... A01K 15/027; A61H 2201/5061; A61H 2201/5064; A61H 2203/03
See application file for complete search history.

(56) References Cited

U.S. PATENT DOCUMENTS

| | | | | |
|---|---|---|---|---|
| 5,081,991 | A | * | 1/1992 | Chance ................ A61B 5/4519 482/901 |
| 5,100,127 | A | * | 3/1992 | Melnick ............. A63B 22/0023 119/700 |

(Continued)

*Primary Examiner* — Tien Q Dinh
*Assistant Examiner* — William L Gmoser
(74) *Attorney, Agent, or Firm* — The Roy Gross Law Firm, LLC; Roy Gross

(57) ABSTRACT

The present invention refers to a device of the treadmill kind for the treatment, recovery or recreation of animals, particularly dogs, enabling physical parameters to be monitored and providing physiotherapy solutions and visual and olfactory stimuli. It is endowed with treadmill (1), pneumatic cylinders (4), neck immobiliser (5) cables (6), harness (7), front motor (8), power and displacement sensor (9), lift support structure (10), physiological sensors (11), calibrated weights (12), rear motor (15) and wheels with brake (16). A motor moves the treadmill (1), elevating the lift platform (10). The device has an aromatherapy dispenser (2) and virtual reality glasses (3). The animal is placed on the treadmill (1), a vest is placed thereon, endowed with physiological sensors, leg strap with calibrated weights (12) and wrist straps endowed with power and displacement sensor (9), held upright by the pneumatic cylinders (4) by way of cables (6).

7 Claims, 2 Drawing Sheets

(52) U.S. Cl.
CPC .............. *A61H 2201/5061* (2013.01); *A61H 2201/5064* (2013.01); *A61H 2203/03* (2013.01)

(56) References Cited

U.S. PATENT DOCUMENTS

| | | | | | |
|---|---|---|---|---|---|
| 5,176,597 | A | * | 1/1993 | Bryne | A61H 3/008 |
| | | | | | 482/54 |
| 5,769,030 | A | * | 6/1998 | Acoff | A01K 27/006 |
| | | | | | 119/856 |
| 6,058,888 | A | * | 5/2000 | Nichols | A01K 1/04 |
| | | | | | 119/702 |
| 6,347,603 | B1 | * | 2/2002 | Felger | A01K 15/027 |
| | | | | | 119/700 |
| 6,837,186 | B1 | * | 1/2005 | Terao | A01K 15/027 |
| | | | | | 119/701 |
| 2002/0177794 | A1 | * | 11/2002 | Smith | A63B 21/0084 |
| | | | | | 601/54 |
| 2007/0130893 | A1 | * | 6/2007 | Davies | A61B 5/1123 |
| | | | | | 54/1 |
| 2008/0149045 | A1 | * | 6/2008 | Gross | A01K 15/027 |
| | | | | | 119/818 |
| 2008/0287266 | A1 | * | 11/2008 | Smith | A01K 11/001 |
| | | | | | 482/54 |
| 2010/0326366 | A1 | * | 12/2010 | Park | A01K 15/027 |
| | | | | | 119/728 |
| 2016/0008650 | A1 | * | 1/2016 | Jue | A63B 21/4009 |
| | | | | | 482/54 |
| 2017/0196196 | A1 | * | 7/2017 | Trottier | A01K 29/005 |
| 2022/0039347 | A1 | * | 2/2022 | Bishop | A01K 15/027 |

* cited by examiner

PHYSICAL TRAINING DEVICE FOR ANIMALS WITH A THERAPEUTICAL AND ENTERTAINING COMPONENT

CROSS REFERENCE TO RELATED APPLICATIONS

This application is a National Phase of PCT Patent Application No. PCT/PT2019/050007 having International filing date of Apr. 26, 2019, which claims the benefit of priority of PT 110714 filed on Apr. 27, 2018. The contents of the above applications are all incorporated by reference as if fully set forth herein in their entirety.

TECHNICAL DOMAIN

The creation of the present invention arose from the need to develop a product that satisfied the needs for physiotherapy in animals—particularly dogs, but usable on other animals—senior, post-surgery, post-trauma or with a pathology of the musculoskeletal system.

The invention took into account the need to develop certain muscle groups based on the type and breed of the animal, namely the groups of the head, neck, chest, abdomen and members.

The device to be claimed is adapted to different weights, breeds, ages and sizes of the animal, by the use of a modular combination of parts that can be adapted for each animal individually, the forces to be applied being adapted based on the result of the animal's anatomy.

This is a complete device consisting of an integrative and modular solution, fully customisable and having interactive technology, which places the animal in a fully controlled and immersive environment. This environment helps monitor the rehabilitation progress of a given animal, taking into account its specific needs.

Said device is comprised of three distinct modules: a treadmill, a support vest with built-in biosensors to record physiological and biomechanical data, and a pair of virtual reality 3D glasses, also capable of providing acoustic and olfactory stimuli.

A monitoring system, jointly with the last module, is added to register the movements of the animal itself.

Due to the modular nature of the complete device, it is possible to implant only the components necessary for one task and one animal in particular.

As a consequence of the immersive virtual environment produced, it is possible to attend to the specific motivation and the occupational interests of a given animal, and also to integrate conventional and interactive rehabilitation methodologies in a more playful context, which involves the animal even more in the process.

The device can be used in clinical or recreational contexts, by doctors, therapists or trained owners.

The device that is the object of the invention provides recourse to complementary equipment so as to achieve the intended results, based on breed, weight, age and aclinical state of the animal, namely games, on-site, distance-controlled food dispenser, temperature control, with relief from heat or cold, sound and image system and strength games and reward.

This equipment enables support and real restraint of the animal (dog and cat) in its most anatomical state, as the entire structure is adapted to the different weights and breeds, comprising vest, sleeves, leg straps with sensors for recording physiological data for adjusting the exercise and gathering of biomedical data for therapeutic approach.

STATE OF THE ART

The use of treadmills is very widely disclosed. It is possible—and practical, in animal rehabilitation centres—to use treadmills, conceived for human use, in the physical recovery of animals.

Recourse to treadmills, however, is only recommended to stimulate the animal to walk. Specifically, they are used in situations of animal obesity and consequent need to stimulate the animal to walk in a more or less prolonged manner.

In the current state of the art, there is no device of the treadmill type exclusively conceived for animals, and that is not limited to promote walking. Rather, as is the case of the device that is the object of the invention, it presents a dedicated and articulated solution for equipment and functions destined for the treatment, recovery or recreation of animals.

Specifically, in the current state of the art, there is no device of the treadmill type with the configuration and functionality of the invention which, simultaneously, is adapted to various species, sizes, ages and physical condition of animals and, at the same time, monitors the most varied physical and psychological parameters of the animal, while at the same time stimulating it in the most diverse of ways.

SUMMARISED GENERAL DESCRIPTION OF THE INVENTION

Figure 1:
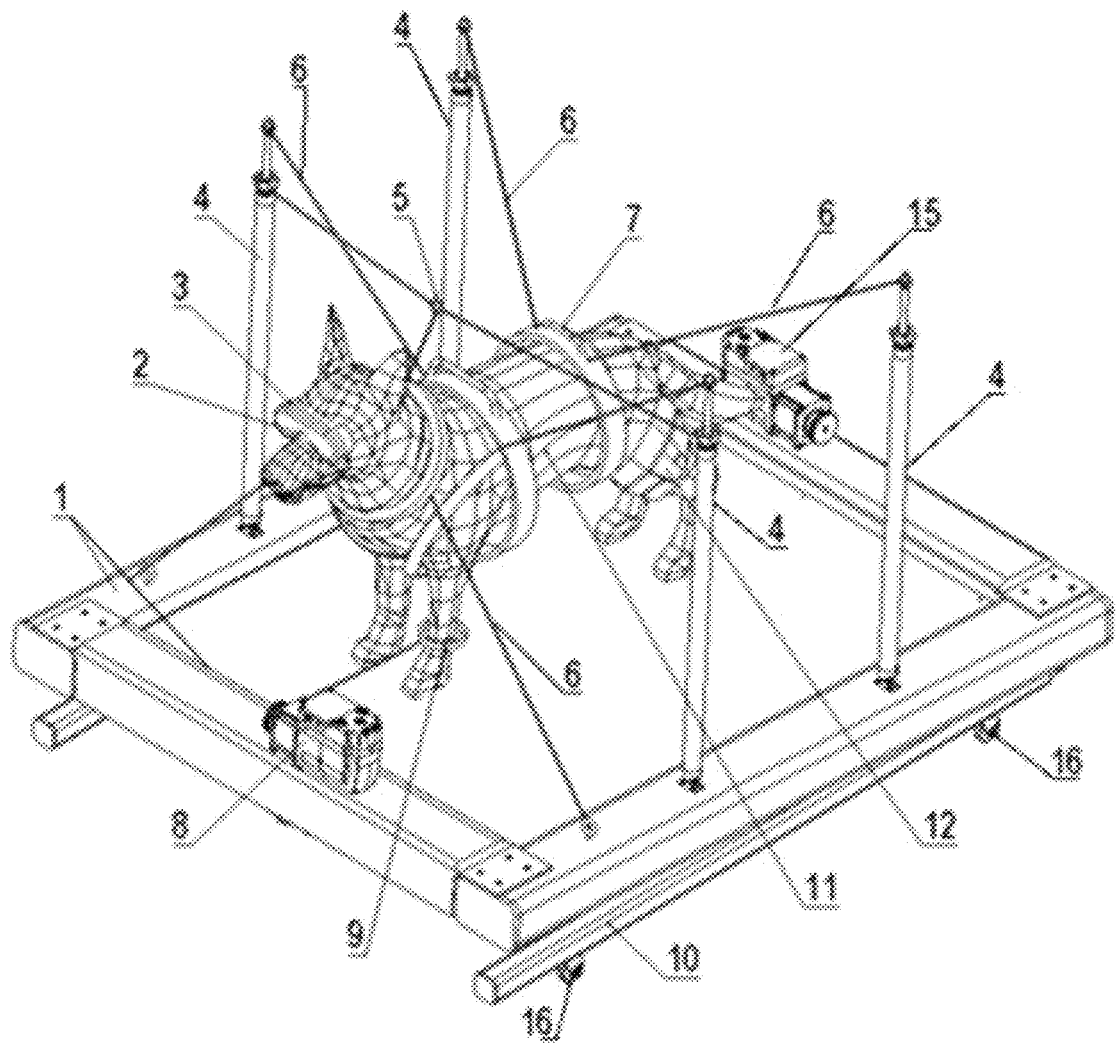
FIG. 1 represents the invention in a general overview, showing the treadmill (1), the aromatherapy dispenser (2), the virtual reality glasses (3), the pneumatic cylinders (4), the neck immobiliser (5) the cables (6), the harness (7), the front motor (8), the power and displacement sensor (9), a lift support structure (10), the physiological sensors (11), the calibrated weights (12), the rear motor (15) and the wheels with brake (16)
Figure 2:
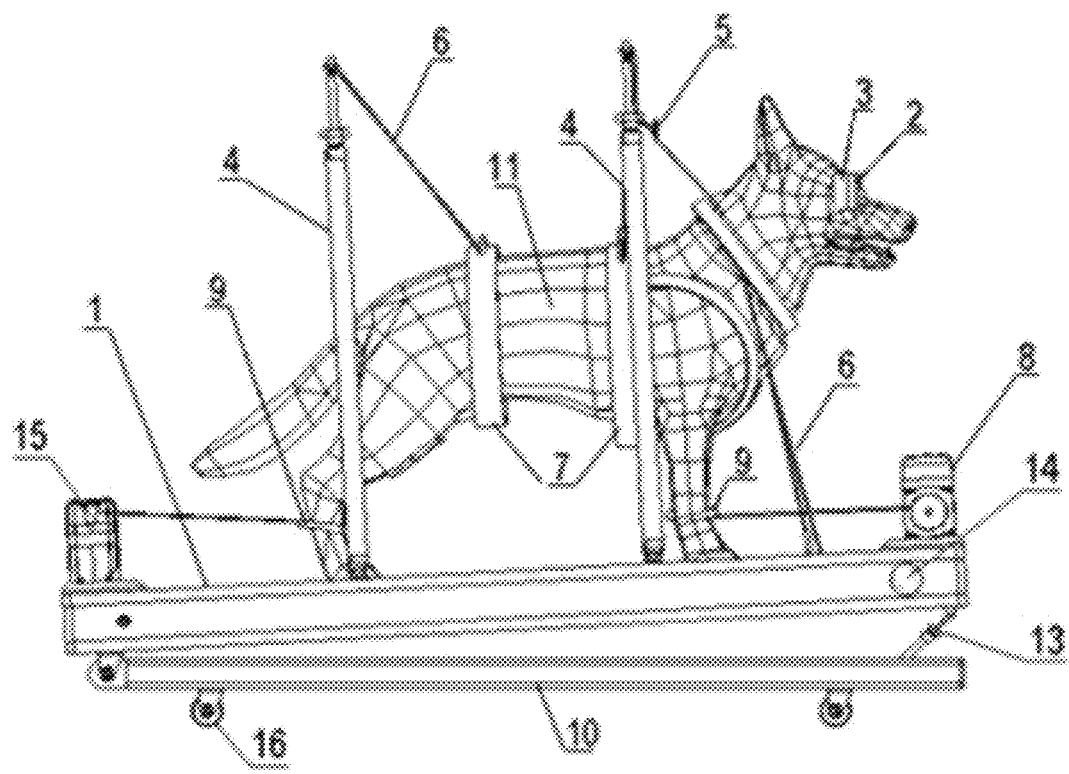
FIG. 2 represents a side view of the invention, showing the treadmill (1), the aromatherapy dispenser (2), the virtual reality glasses (3), the pneumatic cylinders (4), the neck immobiliser (5) the cables (6), the harness (7), the front motor (8), the power and displacement sensor (9), the lift support structure (10), the physiological sensors (11), the auxiliary pneumatic cylinder (13), the belt and lifting motor (14), the rear motor (15) and the wheels with brake (16).

The treadmill represented in FIG. 1 and FIG. 2 is a device that has an endless belt moved by a motor, on which an animal walks or runs for the exercise, physiological tests or clinical recovery.

The treadmill will go up and down due to the extension or due to the compression of a pneumatic cylinder.

The animal can be subjected to aromatherapy and virtual reality during the walk/run on the treadmill.

Additionally, four pneumatic cylinders can raise the animal by way of the harness. A neck immobiliser will be connected to the treadmill and to the two pneumatic cylinders.

Various sensors will be used to monitor the physiological parameters and the calibrated weights will be applied on specific parts of the animal. Two outer motors can be used to apply displacement and force to the members of the animal undergoing the test.

The entire system is supported by four wheels that enable the device to be positioned.

DESCRIPTION OF THE BEST EMBODIMENT OF THE INVENTION

The invention to be claimed is characterised by comprising a self-complementing multiple-component device. It thus essentially consists of a treadmill endowed with front and side lifting mechanisms, pneumatic cylinders placed vertically on the side of the belt platform, a vest, leg straps and wrist straps, these latter three components being endowed with sensors to monitor data. In complement, the device that is the object claimed comprises 3D virtual reality glasses and an aromatherapy dispenser.

The treadmill (1) represented in FIG. 1 and FIG. 2 is a device that has an endless belt, moved by a belt and lifting motor (14), on which an animal, particularly a dog, walks or runs as an exercise, to carry out physiological tests or clinical recovery. The treadmill (1) will go up or down due to the extension or to the compression of an auxiliary pneumatic cylinder (13) driven by said belt and lifting motor (14).

The front motor (8) and the rear motor (15) are placed on the front and rear rims of the treadmill (1).

Either one or the other of said motors has the function of exerting force on the legs of the animal while it walks on the treadmill (1).

Therefore, the front motor (8) is placed at the front of the treadmill (1) and is connected by cable to the power and displacement sensor (9) placed on a wrist strap on the front leg of the animal; the rear motor (15), in turn, is placed at the rear of said belt, also being connected by cable to the power and displacement sensor (9) placed on a wrist strap on the hind leg of the animal.

A vest (FIG. 1 and FIG. 2) housing physiological sensors (11), a leg strap housing the calibrated weights (12) and wrist straps housing the power and displacement sensor (9) are placed on the animal.

The device is endowed with pneumatic cylinders (4), placed vertically on the side platforms of the treadmill (1), from the tops of which cables (6) are projected to the harness (7) which envelops the trunk of the animal.

The combination consisting of the four pneumatic cylinders (4), the cables (6), the harness (7) and the neck immobiliser (5) provide the correct positioning of the animal on the treadmill (1).

The placement of the pneumatic cylinders (4) on the platform and the tension of the respective cables (6) provide the correct positioning of the animal on the treadmill (1). This characteristic of the invention is particularly important in situations where the animal is weak and needs help to remain standing or with a suitable posture.

The pneumatic cylinders (4) can raise the animal by way of the harness (7), which becomes particularly useful in situations where the animal is weak and would not be able to stand by its own means.

To help with a better posture of the animal during treatment, training or monitoring, between the pneumatic cylinders (4) a cable is placed, supporting one of the neck immobilisers (5), the remaining ones being fastened to the side platform of the device.

The lift support structure (10), driven by the belt and lifting motor (14), makes the treadmill (1) go up or down at one of the ends, so as to achieve different ascending angles for walking.

Said belt and lifting motor (14) can also make the treadmill (1) oscillate sidewardly, asymmetrically driving each zone—left or right—of the lift support structure (10) by way of the respective auxiliary pneumatic cylinder (13).

Either in the treatment and recovery process, or in the training process, the animal can be subjected to aromatherapy and virtual reality during the walk/run on the treadmill (1), by placing virtual reality glasses (2) where an aromatherapy dispenser (3) is coupled.

Physiological sensors (11) are placed on the vest placed on the animal, used to monitor its physiological parameters and the calibrated weights (12) will be applied on specific parts of the animal, such as the leg straps.

The entire device is supported by four wheels with brake (16) that enables the device to be positioned.

To monitor the physical condition of the animal under observation, the equipment must have a series of physiological sensors (11), which may include:

Electrocardiogram electrodes to record the heart rate of the animal during the training sessions, diagnosis and medical intervention;

Electromyogram electrodes to record muscle activity. The analyses of said signals will provide crucial information on the performance of specific muscle groups;

An oximeter to measure the levels of oxygen in the blood of the animal. Indirectly, information on the variability of the frequency Various sensors focused on the motor activity of the animal, such as a number of accelerometres, a gyroscope and a force gauge. All these should provide sufficient information on the reach of the animal and the speed of the movements, as well as the force applied by a variety of muscle sets;

A thermometer, since the body temperature is still the most widely used indicator of the animal's medical condition;

A blood pressure gauge. Jointly with the temperature, the blood pressure is one of the routine parameters used by a veterinarian to evaluate the animal's general health status.

All the physiological sensors (11) described will be, indicatively but not limitatively, placed on the support vest or on the mobile platform.

With the help of tools dedicated to processing signals and visualisation, the signals measured will enable a full evaluation of the animal's state of health, on the one hand, but also for an objective and systematic accompaniment of the evolution of the animal's condition during the course of a series of sessions.

The processing and visualisation software tool referred to above is delivered jointly with the hardware apparatus.

Due to the modular nature of the hardware and the software, the type and number of sensors to be used will be based on the specific needs. The objective is also to develop the product on a continuous basis, to include an ever greater series of applications and functionalities.

With a more recreational objective, and with the aim of motivating and stimulating the animal to perform the desired movements, the equipment will also include a virtual reality module. The main aim of the module is to define the animal in an immersive and fully controlled environment. The device will include a combination of 3D virtual reality glasses (3) for visual stimulation, as well as the possibility of including acoustic and olfactory stimuli, such as an aromatherapy dispenser (2). Integrating the stimuli of virtual reality with measuring the animal's movements, as described above, the immersive perception should be potentialised.

The invention claimed is:

1. A gymnastics device for animals comprising:
a treadmill comprising
   a movable belt and a lifting motor,
   pneumatic cylinders placed vertically on side platforms of the treadmill,
   a plurality of pneumatic cylinder cables projecting from the top of the pneumatic cylinders to a harness which envelops a vest configured to be placed on an animal's trunk,
   wherein one of the plurality of the pneumatic cylinder cables supports a neck immobilizer, the pneumatic cylinder cable that supports the neck immobilizer is located between the pneumatic cylinders and connected to the pneumatic cylinders, and
   wherein the remainder of the plurality of pneumatic cylinder cables are connected to the side platform of the device.

2. The gymnastics device according to claim 1, further comprising a vest housing physiological sensor and with a leg strap housing the calibrated weights.

3. The gymnastics device according to claim 1, further comprising a power and displacement sensor, for parameterising data relating to force and displacement, placed on the animal's paw.

4. The gymnastics device according to claim 1, further comprising virtual reality glasses coupled to an aromatherapy dispenser.

5. The gymnastics device according to claim 1, further comprising a lift support structure.

6. The gymnastics device according to claim 1, further comprising wheels with a brake to support and mobilize the device.

7. A gymnastics device for animals comprising:
a treadmill comprising
   a movable belt and a lifting motor,
   pneumatic cylinders placed vertically on side platforms of the treadmill,
   a plurality of pneumatic cylinder cables projecting from the top of the pneumatic cylinders to a harness which envelops a vest configured to be placed on an animal's trunk, and
   a front motor and a rear motor, with sideward oscillation, and each connected to a power and displacement sensor.

* * * * *